(12) United States Patent  
Gibson et al.

(10) Patent No.: US 11,199,293 B2  
(45) Date of Patent: Dec. 14, 2021

(54) GREASE GUN AND NETWORK

(71) Applicant: SKF Canada Limited, Scarborough (CA)

(72) Inventors: Shawn Gibson, Calgary (CA); Rajneesh Saini, Calgary (CA); Lois Gayle Wride, Calgary (CA)

(73) Assignee: SKF CANADA LIMITED, Scarborough (CA)

( * ) Notice: Subject to any disclaimer, the term of this patent is extended or adjusted under 35 U.S.C. 154(b) by 46 days.

(21) Appl. No.: 15/669,570

(22) Filed: Aug. 4, 2017

(65) Prior Publication Data

US 2019/0040998 A1 Feb. 7, 2019

(51) Int. Cl.
| | |
|---|---|
| *F16N 29/02* | (2006.01) |
| *F16N 11/08* | (2006.01) |
| *F01M 11/10* | (2006.01) |
| *F16N 29/04* | (2006.01) |
| *F16N 3/12* | (2006.01) |

(52) U.S. Cl.
CPC ............. *F16N 29/02* (2013.01); *F01M 11/10* (2013.01); *F16N 3/12* (2013.01); *F16N 11/08* (2013.01); *F16N 29/04* (2013.01); *F16N 2270/20* (2013.01)

(58) Field of Classification Search
CPC .......... F16N 29/00; F16N 29/02; F16N 29/04; F01M 11/10
See application file for complete search history.

(56) References Cited

U.S. PATENT DOCUMENTS 5,350,040 A * 9/1994 Gribble ................... F16N 21/00  
184/105.2  
6,101,427 A * 8/2000 Yang ....................... F16N 29/02  
700/241  
(Continued)

FOREIGN PATENT DOCUMENTS

CN 1748189 A 3/2006  
CN 101210645 A 7/2008  
(Continued)

OTHER PUBLICATIONS

Office Action and Search Report from the Chinese Patent Office dated Dec. 29, 2020 in related Chinese application No. CN 201810883572, and translation thereof.

*Primary Examiner* — Minh Truong  
(74) *Attorney, Agent, or Firm* — J-TEK Law PLLC; Scott T. Wakeman; Mark A. Ussai

(57) ABSTRACT

Systems and methods for dispensing lubricant, of which the systems include a grease gun including an outlet. The grease gun is configured to eject lubricant into a machine through the outlet. The grease gun also includes a sensor configured to sense an amount of the lubricant ejected through the outlet, and a communication module in communication with the sensor and configured to transmit first data representing the amount of lubricant ejected through the outlet. The systems further include an intermediary computing device in communication with the communication module, the intermediary computing device being configured to receive the first data from the communication module, transmit the first data to a remote server, and receive second data representing a maintenance action to take on the grease gun, the machine, or both from the remote server.

19 Claims, 5 Drawing Sheets

(56) References Cited

U.S. PATENT DOCUMENTS

| | | | |
|---|---|---|---|
| 6,522,964 B1 * | 2/2003 | Miki | E02F 9/205 172/315 |
| 6,997,286 B1 | 2/2006 | Funck et al. | |
| 8,290,630 B2 * | 10/2012 | Lakomiak | B23Q 17/12 700/275 |
| 8,528,782 B2 * | 9/2013 | Mergener | F16N 29/04 222/37 |
| 8,746,068 B2 * | 6/2014 | Goodman | G01M 13/028 73/593 |
| 9,352,761 B2 * | 5/2016 | Appleby | B61K 3/00 |
| 9,353,908 B2 * | 5/2016 | Kuvaja | F16N 7/38 |
| 9,500,317 B2 | 11/2016 | Peters et al. | |
| 2004/0231927 A1 | 11/2004 | Huang et al. | |
| 2004/0250623 A1 * | 12/2004 | Walker | F16C 19/52 73/593 |
| 2007/0137942 A1 | 6/2007 | Weems et al. | |
| 2007/0240649 A1 * | 10/2007 | Freeman | F02D 19/12 123/1 A |
| 2011/0253481 A1 * | 10/2011 | Lin | F16N 11/08 184/108 |
| 2013/0081903 A1 * | 4/2013 | Alekseyev | F16N 3/12 184/26 |
| 2014/0142791 A1 * | 5/2014 | Boehni | F16N 29/00 701/19 |
| 2016/0169446 A1 * | 6/2016 | Peters | H04B 5/0062 222/1 |
| 2017/0030517 A1 | 2/2017 | Willems et al. | |
| 2017/0089236 A1 * | 3/2017 | Andersen | F01M 11/04 |
| 2018/0017210 A1 * | 1/2018 | Letscher | F16N 7/385 |
| 2018/0063223 A1 | 3/2018 | Donovan et al. | |

FOREIGN PATENT DOCUMENTS

| | | |
|---|---|---|
| CN | 105492818 A | 4/2016 |
| CN | 106441966 A | 2/2017 |
| WO | 2013135742 A1 | 9/2013 |

* cited by examiner

GREASE GUN AND NETWORK

BACKGROUND

Grease guns are used to deliver lubrication in a variety of mechanical settings, including for lubricating bearings. The grease guns generally include a piston that draws in grease from a cartridge into a priming chamber during an upstroke, and expels the grease from the chamber during a downstroke. The grease guns also include a display (e.g., an LCD screen) configured to show information related to the use of the grease gun. This information may include the amount of grease still available in the cartridge and/or priming chamber, the amount of grease ejected from the grease gun during a set time interval, and the like.

An industrial facility can include dozens, or more, machines, which may all require lubrication, but may not all require the same type of lubrication. As such, the facility may employ multiple different grease guns, e.g., for different workers who may follow different maintenance routes between the various machines. This can lead to unequal use of the grease guns, and may present difficulties in keeping the correct lubricants on hand in sufficient volume.

Further, best practices often dictate that the health of the machines be periodically checked. This can include taking measurements of operating temperature, vibrations, etc., in addition to lubricant consumption. Typically, this is conducted by a worker walking through the manufacturing facility on a maintenance route, recording the information at each machine.

SUMMARY

Embodiments of the disclosure may provide a system for dispensing lubricant. The system includes a grease gun including an outlet. The grease gun is configured to eject lubricant into a machine through the outlet. The grease gun also includes a sensor configured to sense an amount of the lubricant ejected through the outlet, and a communication module in communication with the sensor and configured to transmit first data representing the amount of lubricant ejected through the outlet. The system further includes an intermediary computing device in communication with the communication module, the intermediary computing device being configured to receive the first data from the communication module, transmit the first data to a remote server, and receive second data representing a maintenance action to take on the grease gun, the machine, or both from the remote server.

Embodiments of the disclosure may further provide a method including receiving, at a remote server, first data obtained using a grease gun that is configured to supply a lubricant to a machine. The first data includes data representing an amount of the lubricant distributed to the machine. The method also includes determining a status of the grease gun, the machine, or both based on the first data, prescribing a maintenance action for the grease gun, the machine, or both based in part on the status of the grease gun, the machine, or both, and transmitting second data representing the maintenance action to the grease gun via an intermediary computing device.

BRIEF DESCRIPTION OF THE DRAWINGS

The accompanying drawings, which are incorporated in and constitute a part of this specification, illustrate an embodiment of the present teachings and together with the description, serve to explain the principles of the present teachings. In the figures.

Figure 1:
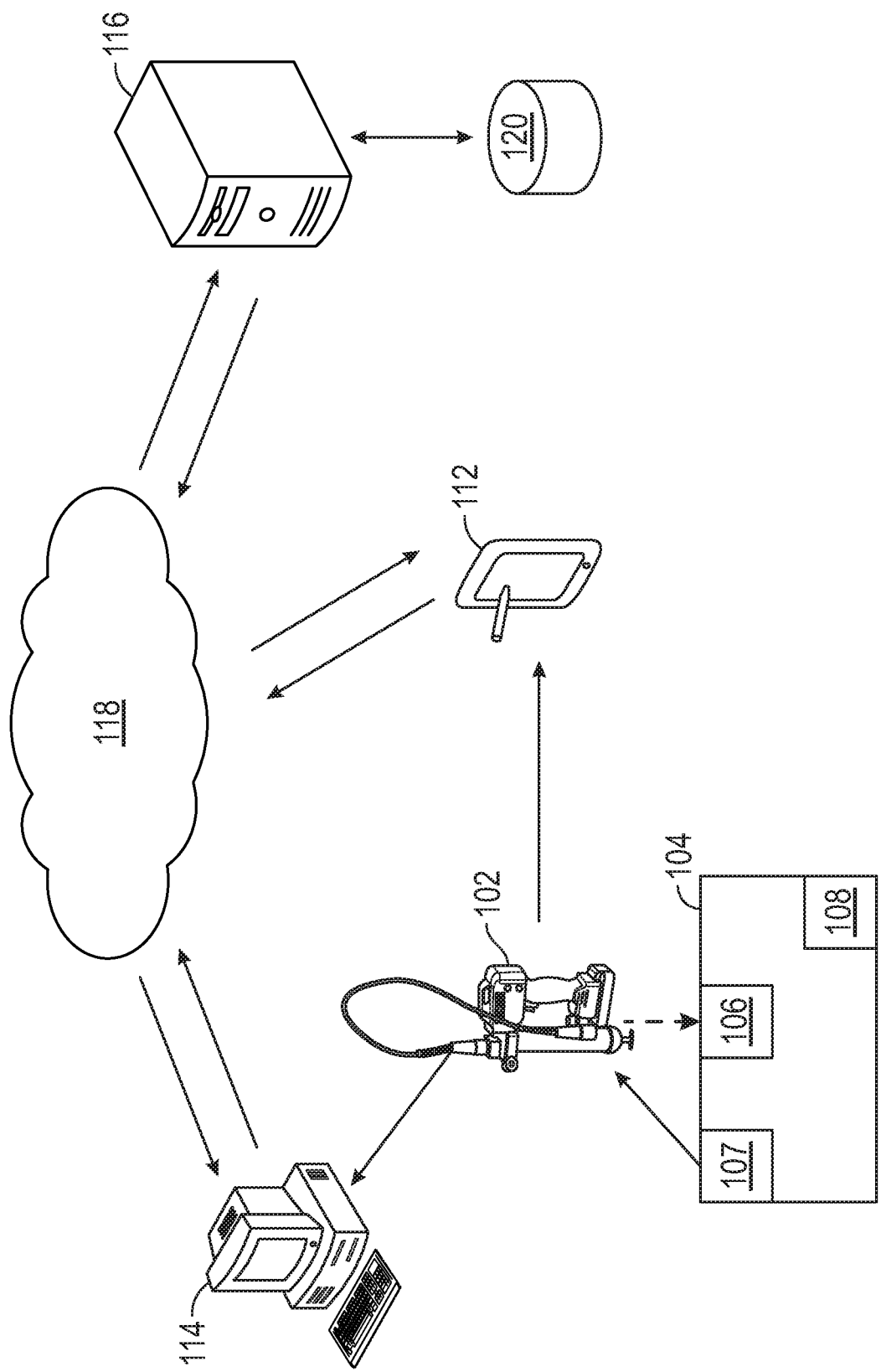
FIG. 1 illustrates a schematic view of a grease gun system, according to an embodiment.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawings. In the drawings, like reference numerals have been used throughout to designate identical elements, where convenient. In the following description, reference is made to the accompanying drawings that form a part of the description, and in which is shown by way of illustration one or more specific example embodiments in which the present teachings may be practiced.

FIG. 1 illustrates a schematic view of a grease gun system 100, according to an embodiment. The system 100 generally includes one or more grease guns 102, which are configured to provide grease (or another lubricant) to one or more machines 104. In particular, the machines 104 may include one or more lubricated components 106, which may be bearings or the like. The grease guns 102 may include a line, nozzle, etc., configured to couple to the machine 104 and deliver grease from the grease gun 102 to the lubricated component 106, as will be discussed in greater detail below.

The machine 104 may also include one or more data-storage devices 107. The data-storage devices 107 may be, in some embodiments, radiofrequency identification (RFID) tags, which may provide information that is unique to the machine 104 or lubricated component 106, such as an identifier number. It will be appreciated that there may be a single RFID for the machine 104, or one for each lubrication point (e.g., corresponding to a lubricated component 106) on the machine 104, and there may, potentially, be many such lubrication points (and thus, correspondingly, many such RFIDs/identifiers). This identifier number may be associated with the machine 104 or one or more lubricated components 106, and additional details about the operating conditions and parameters of the machine 104 or lubricated component 106, in a database. In other embodiments, the data-storage device 107 may include a memory device that stores data collected by one or more sensors 108 of the machine 104. The sensor 108 may be configured to sense one or more operating conditions of the machine 104, e.g., temperature, vibration, power-consumption, etc.

The grease gun 102 may be configured to read data from the data-storage device 107, e.g., by providing a RFID reader, or by interfacing with the data-storage device 107 by other communication mediums, such as through wireless BLUETOOTH® (or the like) communication, or by connecting the grease gun 102 to the data-storage device 107 using one or more plugs and cables.

The system 100 may also include an intermediary computing device, such as a mobile computing device 112, as shown, which may be in communication with the grease gun 102. In an embodiment, the mobile computing device 112 may be a tablet, smartphone, laptop, etc., which may accompany the grease gun 102 and a user on a maintenance route through a facility. In an embodiment, the communications link between the grease gun 102 and the mobile computing device 112 may be a "short-hop" communications link, which is defined as a communications link that extends over a relatively short distance, e.g., within a given manufacturing facility, or within a few meters. An example of such a short-hop link is a BLUETOOTH® communications link.

The mobile computing device 112 may, in some embodiments, be affixed to an unmanned vehicle, such as a drone, which may be configured to follow a worker on a maintenance route, whether autonomously or via remote control. In some embodiments, the mobile computing device 112 may be integrated into the grease gun 102 itself, and thus the "short-hop" communications link between the mobile computing device 112 and the grease gun 102 may be provided, e.g., by a metallization on an integrated circuit board that is connected thereto, or by another internal connection.

In another embodiment, the intermediary computing device may be or additionally include a stationary computing device 114, such as a workstation or server, e.g., located at the same facility as the machine 104. The stationary computing device 114 may be configured to communicate directly with the grease gun 102, or may communicate therewith via the mobile computing device 112. The grease gun 102 and/or mobile computing device 112 may be configured to upload data in batches (e.g., after a maintenance activity, such as a route, shift, day, etc. is complete) to the stationary computing device 114, e.g., via a USB connection, another wired connection, or wirelessly.

The mobile computing device 112 and/or the stationary computing device 114 may be connected to a remote server 116 via a wide-area network 118, e.g., the internet. For example, the remote server 116 may store information uploaded thereto in a database 120. Further, the remote server 116 may provide for access to such information by the stationary computing device 114 and/or the mobile computing device 112, such as a web-portal accessible via a web browser or a special-purpose software application. Further, while in transit and/or while at rest in the database 120 (or anywhere else), the data uploaded may be encrypted or otherwise secured.

The remote server 116 (and/or the stationary computing device 114) may be configured to receive data collected by the grease gun 102, and may perform processing operations based in part on that data. Several specific examples of such processing operations are discussed below. In general, however, the server 116 may make one or more determinations about grease usage, grease gun 102 health, and/or machine 104 health, and may prescribe certain maintenance actions for the machine 104, the lubricated component 106, the grease gun 102, or all. For example, the server 116 may make determinations related to the health of the machine 104 based on the data collected by the grease gun 102 and a priori established operating envelopes for the machine 104. The server 116 may also coordinate the usage of the grease gun 102 within a fleet of grease guns 102, may prescribe routes for individual grease guns, may track grease usage and manage grease inventory, may prescribe dosages for specific machines, may recognize malfunctioning or misused grease guns 102, etc.

These determinations may be sent back to the grease gun 102, the mobile computing device 112, and/or the stationary computing device 114 via the network 118 as data. The mobile computing device 112 and/or the stationary computing device 114 may cause the grease gun 102 to display information relevant to the worker based on the determinations made by the server 116, e.g., on a display found either on the mobile computing device 112 or on the grease gun 102 itself.

Figure 2:
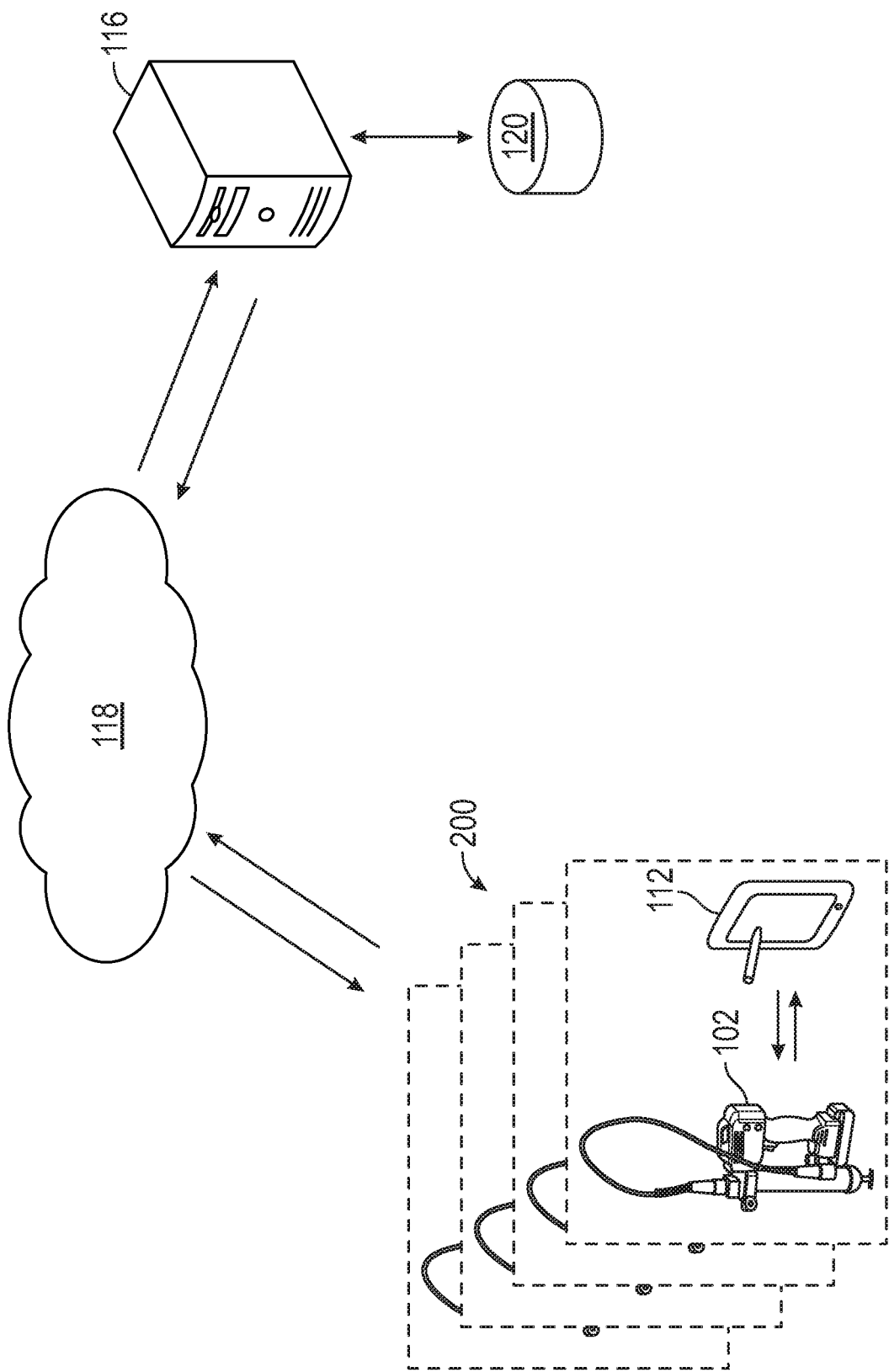
FIG. 2 illustrates another schematic view of the grease gun system, showing the potential for a fleet of grease guns as part of the system, according to an embodiment.

As shown in FIG. 2, the system 100 may include a plurality of such grease guns 102, e.g., as a fleet 200. The plurality of grease guns 102 may be deployed (located) in a plurality of different, geographically separated facilities (e.g., in different buildings located, potentially, in different cities, countries, etc.) Each of the grease guns 102 may each be paired, either temporarily or permanently, with respective mobile computing device 112 of a plurality of mobile computing devices 112. The mobile computing devices 112 may communicate with the server 116 via the network 118 (and/or via the stationary computing device 114). In turn, the server 116 may coordinate the usage of the grease guns 102 in the fleet 200, e.g., to balance usage of the grease guns 102, ensure that the grease guns 102 are loaded with the correct lubricant for the machines 104 on the route; further, the server 116 may specify routes for the grease guns, prescribe dosages for individual machines, etc. The server 116 may send data corresponding to such determinations to the mobile computing devices 112, which may cause the data to be displayed to the worker.

Figure 3:
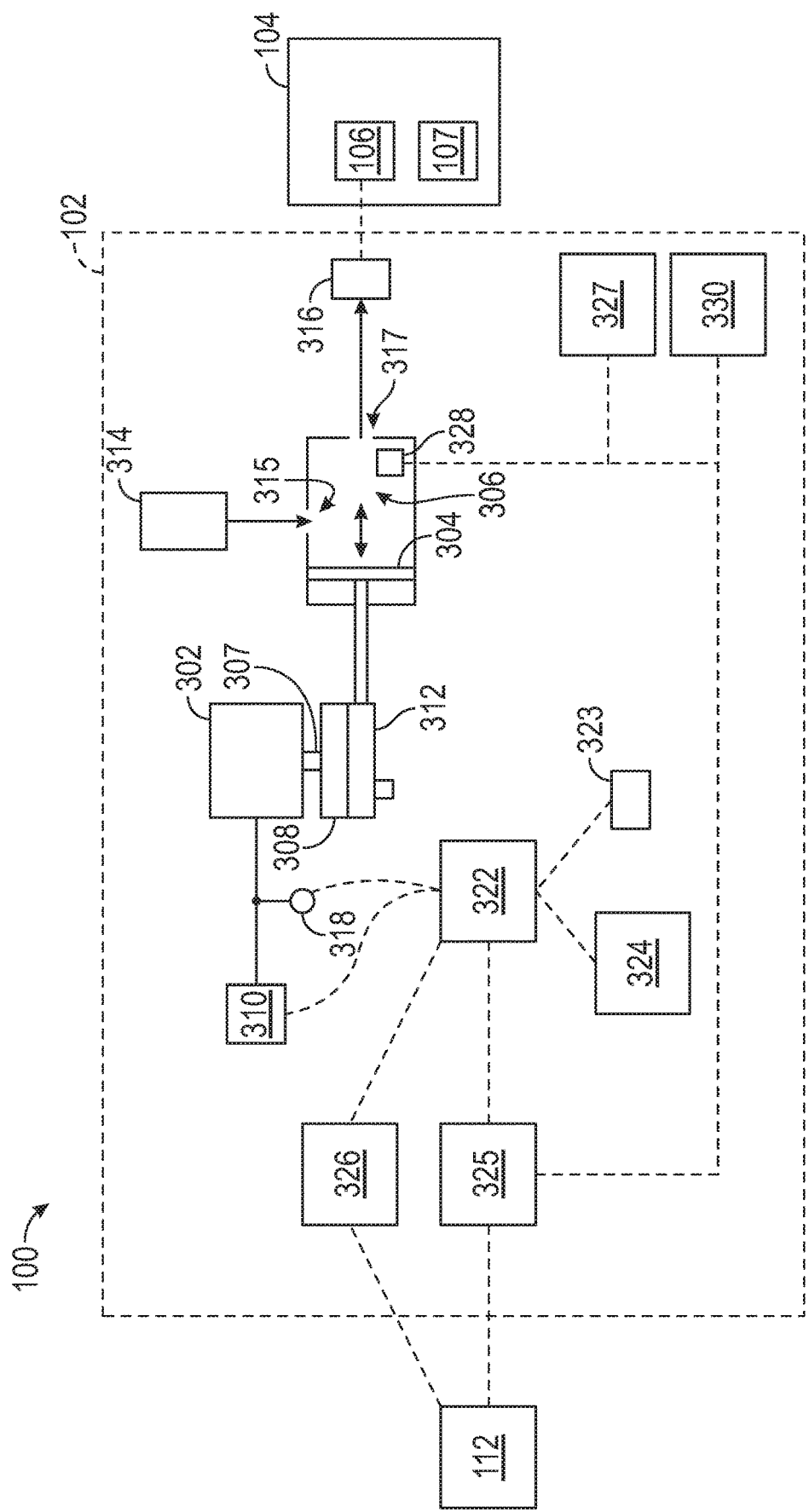
FIG. 3 illustrates another schematic view of the grease gun system, showing grease gun in greater detail, according to an embodiment.

FIG. 3 illustrates another schematic view of the system 100, showing the grease gun 102 in greater detail, according to an embodiment. Although described as a "grease" gun, the grease gun 102 may be configured to dispense any lubricating fluid (e.g., oil), semi-solid lubricant, or the like. As shown, the grease gun 102 may include a motor 302 that drives a piston 304 in a priming chamber 306. For example, the motor 302 may rotate a linkage 308 (e.g., via a shaft 307 and/or one or more gears). The motor 302 may be any suitable type of motor, for example, an AC or DC electric motor of any suitable size. Further, the motor 302 may be powered by a power supply 310, which may be a battery (e.g., 18V). The power supply 310 being a battery may enable the grease gun 102 to be cordless. In other embodiments, the power supply 310 may be a generator, a power grid, or any other source of electricity.

The linkage 308 may include or be coupled with a yoke 312 that translates the rotary motion of the shaft 307 into reciprocating motion in the piston 304. The yoke 312 may be any suitable structure, such as a cam, crank, rack and pinion, etc. Further, the yoke 312 may be configured to apply bi-directional force on the piston 304, such that the piston 304 is moved up and down in the priming chamber 306. It will be appreciated that "up" and "down" as the terms are used herein to describe the movement of the piston 304, refer to the relative position of the piston 304 in the priming chamber 306. For example, as the piston 304 moves "up" (i.e., "upstroke"), a volume in the chamber 306 that is available for the lubricant is increased, and when the piston 304 moves down ("downstroke"), the volume decreases. Although shown as including a piston 304, in other embodiments, the grease gun 102 may a pneumatic dispenser, a reciprocating dispenser, or the like.

The grease gun 102 may also include a lubricant reservoir 314, which may be a removable lubricant cartridge, a refillable reservoir, or the like. The lubricant reservoir 314 may be in fluid communication with an inlet 315, so as to introduce lubricant to the priming chamber 306 from the lubricant reservoir 314. The grease gun 102 may further include an outlet 317, which may be coupled with a fitting 316, for example, a lubricant fitting, via one or more nozzles, conduits, etc. The inlet 315 and outlet 317 may each include any valves (e.g., check valve, poppet valve, etc.) configured to allow the lubricant to flow in the correct direction, as indicated by the arrows, and prevent the flow from reversing.

The grease gun 102 may further include a sensor 318 configured to take a measurement of a condition related to an amount of force applied to the piston 304. For example, the sensor 318 may be configured to measure an electrical current drawn by the motor 302 to rotate the shaft 307. In an embodiment, a larger current measurement may be associated with a greater force applied to move the piston 304, and thus a greater resistance to moving the piston 304 in the chamber 306. The sensor 318 may be electrically coupled with the power supply 310, the motor 302, or anywhere in a power circuit containing the two. Instead of, or in addition to, the sensor 318, the grease gun 102 may include other sensors configured to measure conditions related to the amount of force applied to the piston 304. For example, a torque sensor may be coupled with the shaft 307 or the linkage 308. The torque sensor may measure an amount of force being applied to the shaft 307 or the linkage 308 to move the piston 304, and may thus perform a similar function to the sensor 318. In other embodiments, any other suitable type of sensor may be employed.

The grease gun 102 may further include a controller 322, which may be coupled with the motor 302, the power supply 310, and/or the sensor 318. The controller 322 may be or include a printed circuit board including one or more microprocessors, programmable logic units, or the like. The controller 322 may be configured to determine the amount of lubricant that is dispensed through the outlet 317 from the measurements taken by the sensor 318. Further, the controller 322 may be configured to detect cavitation of the grease gun 102 using such measurements. Additional details regarding the detection of cavitation in a grease gun using such sensors are discussed in U.S. Pat. Nos. 9,500,317 and 9,512,962, which are incorporated herein by reference, to the extent not inconsistent with the present disclosure.

The grease gun 102 may include a communication module 325. The communication module 325 may be part of, or in communication with, the controller 322. The communication module 325 may be or include an antenna or other device configured to transmit and/or receive signals. The communication module 325 may be configured to communicate with (e.g., transmit signals to and/or receive signals from) the machine 104, e.g., with the data-storage device 107 thereof. The communication module 325 may communicate via a wire or cable, or the communication module 325 may communicate wirelessly via an electromagnetic field, a wireless local area network ("WLAN"), BLUETOOTH®, or the like.

In some embodiments, the grease gun 102 may include a reader 327 configured to read data from the data-storage device 107 of the machine 104. For example, the reader 327 may be a radio frequency identification ("RFID") reader, and the data-storage device 107 may be an RFID tag located on the machine 104. The reader 327 may be in communication with the communication module 325.

In some embodiments, the grease gun 102 may further include a moisture sensor 328. The moisture sensor 328 may be, for example, located in the chamber 306, and may be configured to detect a moisture content of the grease being ejected through the outlet 317. The moisture sensor 328 may be in communication with the communication module 325, such that the moisture conditions sensed by the moisture sensor 328 may be communicated to the remote server 116.

In some embodiments, the grease gun 102 may also include a machine condition sensor 330. The machine condition sensor 330 may be configured to detect one or more operating conditions of the machine 104 directly, e.g., without communication with an external data storage device. The machine condition sensor 330 may, for example, be configured to measure temperature, vibration, moisture, etc. Accordingly, this onboard sensor 330 may enable the grease gun 102 to function as a dual-use device, collecting condition-monitoring information for the machines 104 while providing the lubricant thereto.

The communication module 325 may be configured to communicate with the mobile computing device 112, e.g., via a short-hop communications link. As mentioned above, the mobile computing device 112 may be configured to communicate with the remote server 116 via the network 118. Thus, information read by the reader 327 and/or sensed by the sensors 328 and/or 330 may be communicated from the grease gun 102 to the remote server 116 via the mobile computing device 112, as shown. In turn, the remote server 116 may be configured to make determinations and send data back to the grease gun 102, as will be described in greater detail below. In other embodiments, the mobile computing device 112 may be onboard the grease gun 102, and thus the grease gun 102 may be configured to communicate directly with the server 116. In still other embodiments, the intermediary computing device may include the stationary computing device 114, which may relay communications between the remote server 116 and the grease gun 102. Such stationary computing device 114 may be provided in lieu of or in addition to the illustrated mobile computing device 112.

The controller 322 may also be coupled with a display 324, which may provide graphical indications of the status, performance, error, etc. of the grease gun 102. The controller 322 may be coupled with one or more inputs 323 (e.g., switches or buttons) whether physical or integrated into the display 324 (e.g., as a touch screen). In some embodiments, the controller 322, the communications module 325, the display 324, and/or the inputs 323 may be part of the mobile computing device 112, e.g., with the mobile computing device 112 integrated into the grease gun 102. When integrated into the grease gun 102, the components may be communicable via a metallization of an integrated circuit board, or otherwise configured for high-speed, local communication.

In operation of the grease gun 102, the motor 302 drives the piston 304 up and down in the priming chamber 306. The speed of the motor 302 may be determined by the controller 322, e.g., according to a set point entered, e.g., by a user. If the reservoir 314 is not empty, and the fitting 316 is not blocked, then the motor 302 driving the piston 304 on the upstroke may reduce a pressure in the priming chamber 306, thereby forcing lubricant, or otherwise allowing lubricant to move, from the reservoir 314 and into the priming chamber 306. On the downstroke, the piston 304 may drive the lubricant through the outlet 317 and, e.g., through the fitting 316.

The controller 322 may receive setpoint inputs entered by a user via the display 324. The setpoints may be related to a rate at which lubricant is pumped from the reservoir 314 to the outlet 317. The controller 322 may convert these setpoints to speeds in the motor 302 and control the speed of the motor 302 accordingly. For example, the controller 322 may set a duty cycle based on the setpoint input, thereby varying the voltage applied to the motor 302.

The controller 322 may determine the amount of lubricant ejected through the outlet 317 based on measurements taken by the sensor 318. Further, the grease gun 102 (e.g., using the controller 322 or another component) may detect moisture in the lubricant using the sensor 328. The grease gun 102 may also detect machine 104 conditions using the sensor 330, and/or may read information related to the machine 104 (e.g., an identifier or a history of operating conditions) via the reader 327. Any part or all of this data may be communicated to the communication module 325, and may then be transmitted ultimately to the server 116, via the aforementioned short-hop, wired, and/or network connections. The server 116 may make determinations based on the data and send such determinations back to the grease gun 102. In other embodiments, however, the grease gun 102 (e.g., the controller 322) may make at least some of these determinations autonomously, without requiring communication with the server 116.

Figure 4:
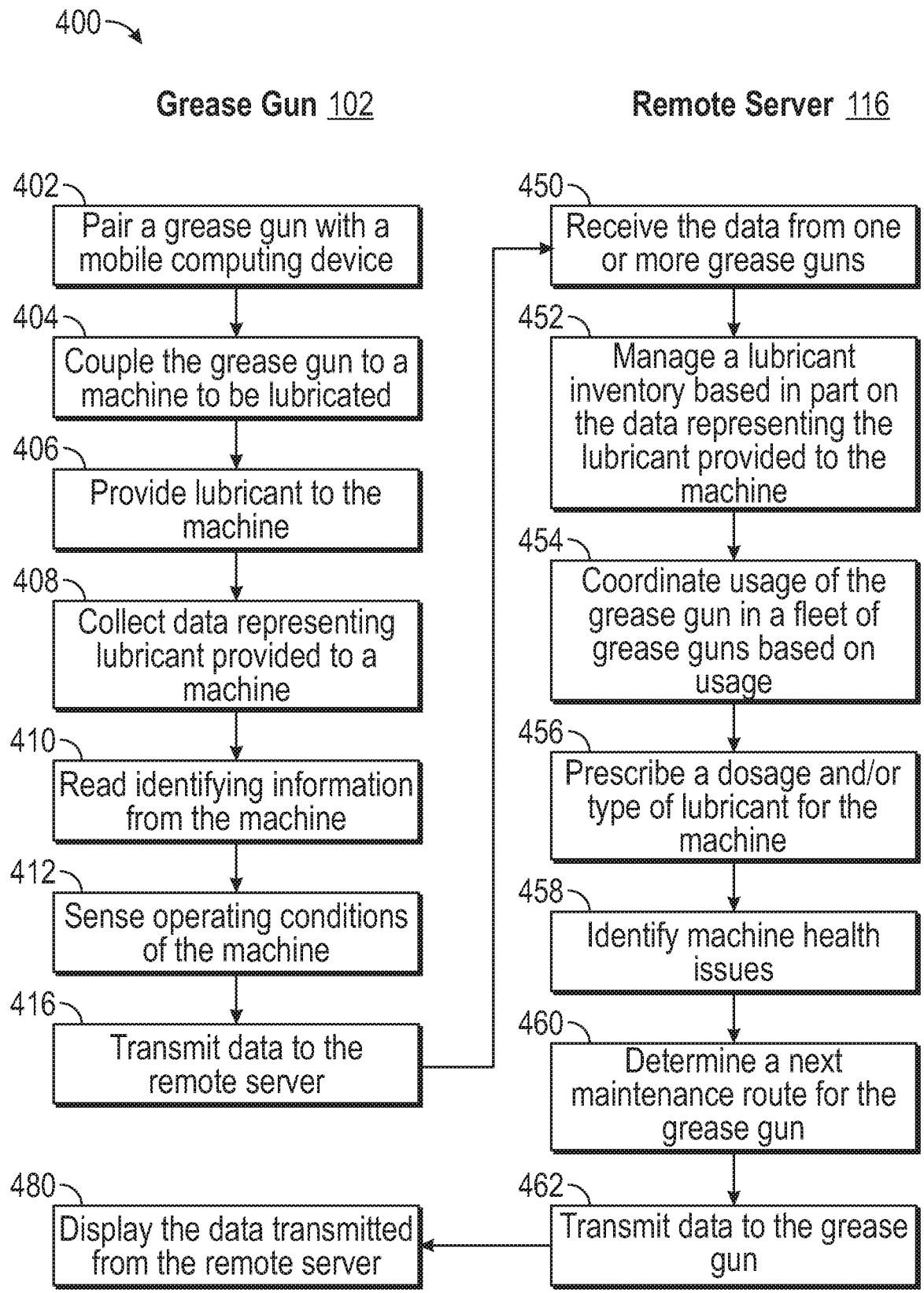
FIG. 4 illustrates a flowchart of a method for distributing lubricant using the grease gun system, according to an embodiment.
Figure 5:
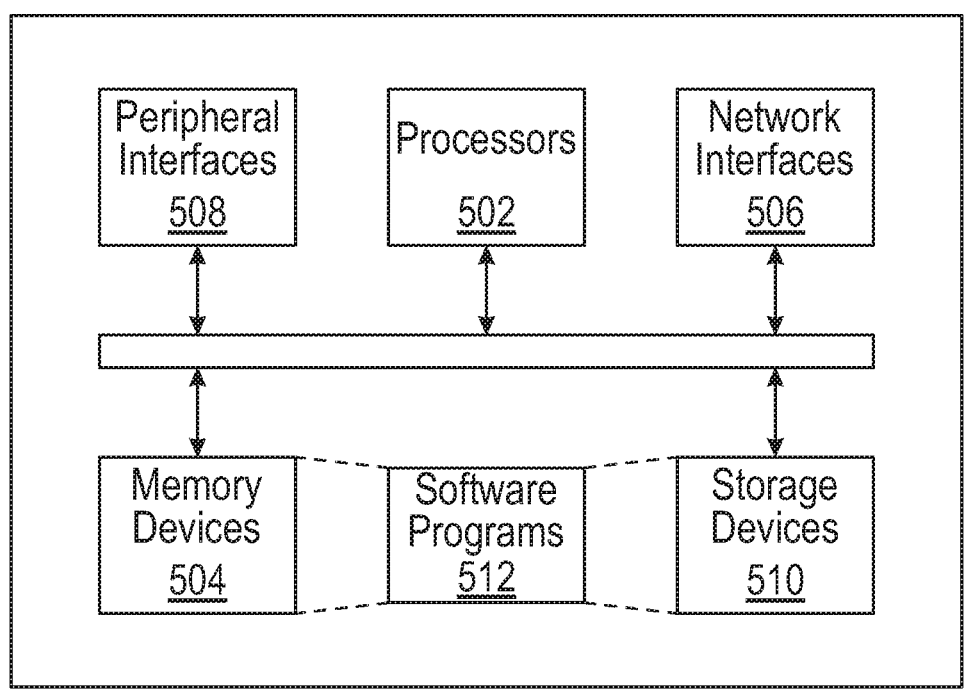
FIG. 5 illustrates a schematic view of a computing system, which may provide any of the computing systems that form part of the system of FIGS. 1-3, according to an embodiment.

FIG. 4 illustrates a flowchart of a method 400 for distributing lubricant and collecting data related to a machine, according to an embodiment. The method 400 may be executed using one or more embodiments of the system 100 discussed above, and thus the method 400 is described herein with reference to the system 100. It will be appreciated, however, that the method 400 may be executed using other systems and is thus not to be considered limited to any particular structure unless otherwise stated herein.

The method 400 may include pairing a grease gun 102 with a mobile computing device 112, as at 402. In some embodiments, this may occur when the grease gun 102 is assembled, e.g., with the mobile computing device 112 being on-board the grease gun 102. In other embodiments, pairing at 102 may occur on-demand, e.g., by acquiring a mobile computing device 112 (such as a smartphone or tablet) and causing a short-hop communications link to be established between the grease gun 102 and the mobile computing device 112. In some embodiments, the mobile computing device 112 may be omitted and, e.g., substituted with the stationary computing device 114.

The grease gun 102 may be employed on a maintenance route, e.g., a set path in a facility, order in which certain machines are lubricated, etc., which may be specified to the grease gun 102 (e.g., from the remote server 106) and displayed to a user on the display 324. The method 400 may then proceed to coupling the grease gun 102 to a machine 104 that is to be lubricated, as at 404. Such coupling includes fitting the outlet 317 of the grease gun 102 to the lubricated component 106 of the machine 104, so that the grease gun 102 can provide lubricant thereto. During such coupling (or potentially caused by the coupling), the grease gun 102 may also be configured to acquire data from or about the machine 104. For example, the reader 327 may be communicably coupled to the data-storage device 107. Further, the sensor 330 may communicate with the machine 104, acquiring data related to the operation of the machine 104.

Once coupled to the machine 104, the method 400 may proceed to providing lubricant to the machine 104, as at 406. Before, during, or after such lubrication at 406, the method 400 may further include collecting data representing lubricant (e.g., type, amount, user that conducted the dispensing, time, date, etc. of dispensing, and the like) provided to the machine 104, as at 408. This data may be collected by an on-board sensing unit, such as the sensor 318 in combination with the controller 322. In other embodiments, this data could be manually entered into the mobile computer device 112 and/or to the grease gun 102 via the inputs 323.

Further, and also before, during, or after lubrication at 406, the method 400 may include reading the identifying (or other types of) information from the machine 104, as at 410. This may proceed by the reader 327 acquiring information about the machine 104 from the data-storage device 107. In other embodiments, the grease gun 102 and/or the mobile computing device 112 may be provided with a scanner, and the data-storage device 107 may include a bar code or the like that may be scanned by the scanner. Also before, during, or after lubrication at 406, the method 400 may include sensing operating conditions of the machine 104, e.g., using the sensor 330, as at 412.

The data acquired by the grease gun 102 sensors may be transmitted to and at least temporarily stored by the controller 322. At some point, whether in real-time, batch-wise, on-demand, or otherwise, the data may be transmitted to the remote server 116, as at 414. For example, the communications module 325 may provide the data to the mobile computing device 112 via a short-hop link. The mobile computing device 112 may, in turn, transmit the data to the remote server 116 via the network 118. Alternatively, the grease gun 102 may communicate with the remote server 116 via the stationary computing device 114, either wirelessly or via a wired connection, and the stationary computing device 114 may communicate with the server 116 via the network 118.

On the remote server 116 end, the method 400 may include receiving the data from the grease gun 102, as at 450. The system 100 may include several (e.g., a fleet 200) of such grease guns 102, and thus the remote server 116 may be operable to handle a database of information received therefrom, and to coordinate usage of the grease guns 102 and potentially dozens (or more) machines 104 services by the grease guns 102.

For example, the remote server 116 may be coupled with enterprise software, which may be employed to manage lubricant inventory based in part on the data representing the lubricant provided to the machine 104, as at 452. For example, the lubricant used by a given grease gun 102 may be subtracted from the lubricant of the kind in a user's facility. When the lubricant reaches a lower threshold, the remote server 116 may seek to acquire additional inventory, e.g., through placing an order or notifying a purchaser.

The method 400 may also include the remote server 116 coordinating usage of the grease guns 102 in the fleet 200 of grease guns 102 based on usage, as at 454. For example, some grease guns 102 may tend to be employed more often than others, e.g., based on storage placement or the route that is typically run by this grease gun 102. The method 400 may allow the remote server 116 to track usage of the grease gun 102, e.g., based on the amount of lubricant pumped, the number of days used, the number of maintenance routes run, etc. The method 400 may then allow the remote server 116 to prescribe particular guns 102 for particular routes, so as to balance usage (e.g., reduce usage of over-used guns 102, and increase usage of under-used guns 102).

The method 400 may also allow the remote server 116 to determine maintenance actions for the grease gun 102, the machine 104, or both. For example, the remote server 116 may prescribe dosages and/or types of lubricants for different machines, as at 456. For example, the lubricant needs of a machine 104 and/or a component thereof may change over the life-cycle thereof. The data collected by the grease gun 102 about the operating conditions of the machine 104 may serve to inform the remote server 116 about machines 104 that are under-lubricated or over-lubricated, and the dosages thereof may be adjusted accordingly. Similarly, if a machine 104 is operating out of a design/operational envelope, it may indicate a machine health issue, which the remote server 116 may identify, as at 458. The remote server 116 may then recommend mitigating steps, sound alarms, etc.

The remote server 116 may also determine "next" (e.g., any subsequent) maintenance routes for the individual grease guns, as at 460. The maintenance routes may be based on utilization balancing, as explained above. The maintenance routes may also be based on the grease that is available in/to a particular gun, versus the needs of the machines on a particular route.

The method 400 may then proceed to transmitting the data determined by the remote server 116 using any of blocks 450-458 back to the grease gun 102, as at 460. Depending on the embodiment, the intermediary computing device (e.g., the stationary computing device 114 and/or the mobile computing device 112) may relay the data from the remote server 116 to the grease gun 102, e.g., the controller 322 thereof. The controller 322 may, in turn, cause relevant data to be displayed to the user, e.g., on the display 324, as at 480. In some embodiments, the transmission of the data back to the grease gun at 460 may occur before, during, or after providing the lubricant at 404, and may, for example, include a dosage for an individual machine 104 after the machine is identified at 410.

The displayed data may be relevant in the sense that the user may make decisions based upon the data. The data may thus include a type of lubricant to use with the grease gun 102, a route to take, a dosage for a particular machine, a machine that needs to be repaired/taken off-line, alarms, instructions, etc.

In some embodiments, the grease guns 102 may communicate in a peer-to-peer, or in any other type of, configuration and make at least some of the aforementioned determinations rather than requiring the server 116 (or the intermediate computing device) to make the determinations. In some embodiments, the grease guns 102 may make at least some of the determinations mentioned above without communicating externally.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such a feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A system for dispensing a lubricant, comprising:
a portable grease gun operable by a user comprising:
  a housing including a handle portion;
  an outlet releasably coupleable with each one of a plurality of machines, wherein the grease gun is configured to eject lubricant into each one of the machines through the outlet when conducted by the user so as to initiate a lubrication event at each particular machine;
  a first sensor configured to sense an amount of the lubricant ejected through the outlet and a second sensor configured to sense operating conditions of each machine being lubricated; and
  a communication module in communication with the first sensor and with the second sensor, configured to transmit first data representing at least one of the amount of lubricant ejected through the outlet and operating conditions of the machine; and
an intermediary computing device configured to communicate with both of the communication module and a remote server during the lubrication event, at least one of the grease gun and the intermediary computing device including a display, wherein the intermediary computing device is configured to:
  receive the first data from the communication module during the lubrication event;
  transmit the first data to the remote server during the lubrication event; and
  receive second data during the lubrication event based on the first data, the second data representing a maintenance action for implementation by the user to take on the grease gun, the machine, or both from the remote server and to display the maintenance action on the display, wherein the maintenance action to take on each machine is based on the operating conditions of the machine.

2. The system of claim 1, wherein the maintenance action comprises at least one selected from the group consisting of a dosage of lubricant for the machine, a type of lubricant for the machine, a corrective action to take on the grease gun, and a corrective action to take on the machine.

3. The system of claim 1, wherein the intermediary computing device comprises a mobile computing device that is in short-hop communication with the grease gun while the grease gun is ejecting lubricant and in communication with the remote server via the internet.

4. The system of claim 3, wherein the mobile computing device is configured to cause a display to display the second data related to the maintenance action, for implementation by a user using the grease gun.

5. The system of claim 1, wherein the intermediary computing device is contained within the grease gun.

6. The system of claim 1, further comprising the remote server, the remote server being in communication with the intermediary computing device, wherein the remote server is configured to, receive the first data from the intermediary computing device; determine the maintenance action for the grease gun, the machine, or both; and transmit the second data representing the maintenance action to the intermediary computing device, wherein the intermediary computing device is configured to transmit at least part of the second data to the communication module of the grease gun.

7. The system of claim 6, further comprising a plurality of grease guns and a plurality of intermediary computing devices, each of the plurality of grease guns including a sensor and a communication module in communication with one of the plurality of intermediary computing devices, wherein the remote server is configured to coordinate a usage of the plurality of grease guns based at least in part on an amount of lubricant used in the respective grease guns of the plurality of grease guns, or a type of lubricant used in the respective grease guns, or both.

8. The system of claim 6, wherein the remote server is configured to manage a lubricant inventory for a facility based in part on the first data.

9. The system of claim 1, wherein the grease gun further comprises a reader in communication with the communication module, wherein the reader is configured to acquire an identifier representing a particular machine or lubricated component thereof, the communication module being configured to transmit the identifier with the first data.

10. The system of claim 9, wherein the reader is configured to communicate with a data storage device of or on the particular machine, wherein the data storage device stores the identifier, and wherein the reader acquires the identifier from the data storage device.

11. The system of claim 1, wherein the grease gun further comprises a reader configured to communicate with a storage device of the machine, to acquire data representing the operating conditions from the storage device.

12. The system of claim 1, wherein the second sensor is a machine condition sensor in communication with the communication module, and wherein: the machine condition sensor is configured to detect one or more operating conditions of the machine; the communication module is configured to transmit third data representing the one or more operating conditions of the machine to the intermediary computing device; and the intermediary computing device is configured to transmit the third data to the remote server.

13. The system of claim 12, wherein: the remote server is configured to determine that the machine is operating outside of an operating envelope based in part on the third data and to send a signal representing that the machine is operating outside of the operating envelope to the intermediary device; and the intermediary device is configured to receive the signal from the remote server and cause a display to display a message representing that the machine is operating outside of the operating envelope.

14. The system of claim 1, wherein the maintenance action comprises a route to follow using the grease gun.

15. The system of claim 1, wherein the operating conditions include at least one selected from the group consisting of:
machine temperature;
machine vibration; and
machine power-consumption.

16. The system of claim 15, wherein the maintenance action is further based on the amount of lubricant ejected.

17. The system of claim 16, wherein the operating conditions indicate a health of the machine, wherein the maintenance action is further based on health of the machine.

18. The system of claim 1, further comprising a controller, wherein the controller determines the amount of lubricant ejected through the outlet based on one or more measurements obtained by the first sensor.

19. The system of claim 18, wherein the one or more measurements include at least one selected from the group consisting of:
a force applied to a piston used to eject lubricant through the outlet;
a torque applied to a shaft coupled to the piston; and
a torque applied to a linkage coupled to the piston.

* * * * *